United States Patent
Grewal et al.

(10) Patent No.: US 11,535,251 B2
(45) Date of Patent: Dec. 27, 2022

(54) FULL SPEED RANGE ADAPTIVE CRUISE CONTROL FOR A VEHICLE

(71) Applicant: GM GLOBAL TECHNOLOGY OPERATIONS LLC, Detroit, MI (US)

(72) Inventors: Amanpal S. Grewal, Novi, MI (US); Dmitriy Feldman, West Bloomfield, MI (US); Robert C. Baraszu, Livonia, MI (US); Chinar Dhamija, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 225 days.

(21) Appl. No.: 16/990,504

(22) Filed: Aug. 11, 2020

(65) Prior Publication Data
US 2022/0048507 A1 Feb. 17, 2022

(51) Int. Cl.
*B60W 30/17* (2020.01)
*B60W 30/09* (2012.01)
*B60W 10/18* (2012.01)
*B60W 10/20* (2006.01)

(52) U.S. Cl.
CPC ............ *B60W 30/17* (2013.01); *B60W 10/18* (2013.01); *B60W 10/20* (2013.01); *B60W 30/09* (2013.01); *B60W 2420/42* (2013.01); *B60W 2420/52* (2013.01); *B60W 2554/802* (2020.02)

(58) Field of Classification Search
None
See application file for complete search history.

(56) References Cited

U.S. PATENT DOCUMENTS

| 8,423,259 B2 | 4/2013 | Labuhn et al. |
| 2010/0152963 A1* | 6/2010 | Heckel .................. B60W 30/17 701/29.2 |
| 2010/0280728 A1 | 11/2010 | Labuhn et al. |

* cited by examiner

*Primary Examiner* — Alan D Hutchinson
*Assistant Examiner* — Andy Schneider
(74) *Attorney, Agent, or Firm* — Vivacqua Crane PLLC

(57) ABSTRACT

A full speed range adaptive cruise control system for a host vehicle includes a plurality of sensors that each generate a signal, a memory that includes executable instructions and a processor that executes the executable instructions. The executable instructions enable the processor to detect a target vehicle as being stopped along a route based upon the signals from the plurality of sensors, cause the host vehicle to stop at a distance from the target vehicle, detect the target vehicle moving along the route after the host vehicle has stopped based upon the signals from the plurality of sensors, determine whether a first predetermined period of time has elapsed since the host vehicle has stopped, determine whether a first predetermined condition is satisfied if the first predetermined period of time has elapsed, and cause the host vehicle to move if the system determines that the first predetermined condition is satisfied.

7 Claims, 4 Drawing Sheets

FULL SPEED RANGE ADAPTIVE CRUISE CONTROL FOR A VEHICLE

FIELD

The present disclosure relates to a full speed range adaptive cruise control for a vehicle.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

The operation of modern vehicles is becoming more automated (i.e. able to provide driving control with less and less driver intervention). Vehicle automation has been categorized into numerical levels ranging from zero, corresponding to no automation with full human control, to five, corresponding to full automation with no human control. Various advanced driver-assistance systems (ADAS) provide features such as, for example, cruise control, adaptive cruise control, and parking assistance. In particular, the adaptive cruise control feature generally uses sensors to detect lane markers and other roadway indicators to generate a motion path for the vehicle to follow to remain within a vehicle lane on the roadway. Moreover, when this adaptive cruise control feature provides Full Speed Range Adaptive Cruise Control or "FSRACC" functionality, upon the detection of another vehicle being stopped on the roadway, the feature will enable the vehicle to come to a complete stop behind this stopped third-party vehicle and subsequently cause the vehicle to resume motion after the third-party vehicle is removed from the vehicle's path.

Current FSRACC technology may rely on the stopped third-party vehicle's sensed position and sensed velocity to know when to activate the brake control to cause vehicle relaunch. However, the amount of time which has elapsed since the vehicle has stopped may be used to limit the ability of the FSRACC system to initiate relaunch. Such systems may incorporate an auto resume at standstill timer which may be limited to a predetermined period of time. Beyond the predetermined period of time, the FSRACC system may be prevented from initiating vehicle relaunch. Vehicle relaunch and re-engagement of the FSRACC may then require a user-initiated action such as, for example, pressing a "resume" switch and/or a momentary accelerator pedal input.

SUMMARY

In an exemplary aspect, a full speed range adaptive cruise control system for a host vehicle includes a plurality of sensors that each generate a signal, a memory that includes executable instructions and a processor that executes the executable instructions. The executable instructions enable the processor to detect a target vehicle as being stopped along a route based upon the signals from the plurality of sensors, cause the host vehicle to stop at a distance from the target vehicle, detect the target vehicle moving along the route after the host vehicle has stopped based upon the signals from the plurality of sensors, determine whether a first predetermined period of time has elapsed since the host vehicle has stopped, determine whether a first predetermined condition is satisfied if the first predetermined period of time has elapsed, and cause the host vehicle to move if the system determines that the first predetermined condition is satisfied.

In another exemplary aspect, the first predetermined condition includes a first predetermined number of sensors and determining whether the first predetermined condition is satisfied includes determining whether a number of the plurality of sensors in the host vehicle that detects the target vehicle exceeds the first predetermined number of sensors.

In another exemplary aspect, the executable instructions further enable the processor to disengage the adaptive cruise control if the amount of time which has elapsed since the host vehicle has stopped exceeds the first predetermined period of time.

In another exemplary aspect, the plurality of sensors includes at least two different types of sensor.

In another exemplary aspect, the first predetermined condition includes a first predetermined number of types of sensors, and determining whether the first predetermined condition has been satisfied includes determining whether a number of types of sensors that detect the target vehicle exceeds the first predetermined number of types of sensor.

In another exemplary aspect, the first predetermined number of types of sensors includes at least one type of sensor.

In another exemplary aspect, the first predetermined number of types of sensors includes at least two types of sensors.

In another exemplary aspect, the first predetermined condition includes a first predetermined type of sensor and determining whether the first predetermined condition is satisfied includes determining whether at least one of the plurality of sensors that detects the target vehicle includes the first predetermined type of sensor.

In another exemplary aspect, the executable instructions further enable the processor to determine whether the amount of time which at least one of the plurality sensors has detected a target vehicle exceeds a predetermined timer count threshold.

In another exemplary aspect, the executable instructions further enable the processor to determine that the at least one of the plurality of sensors has not detected a target vehicle if the predetermined timer count is not exceeded.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
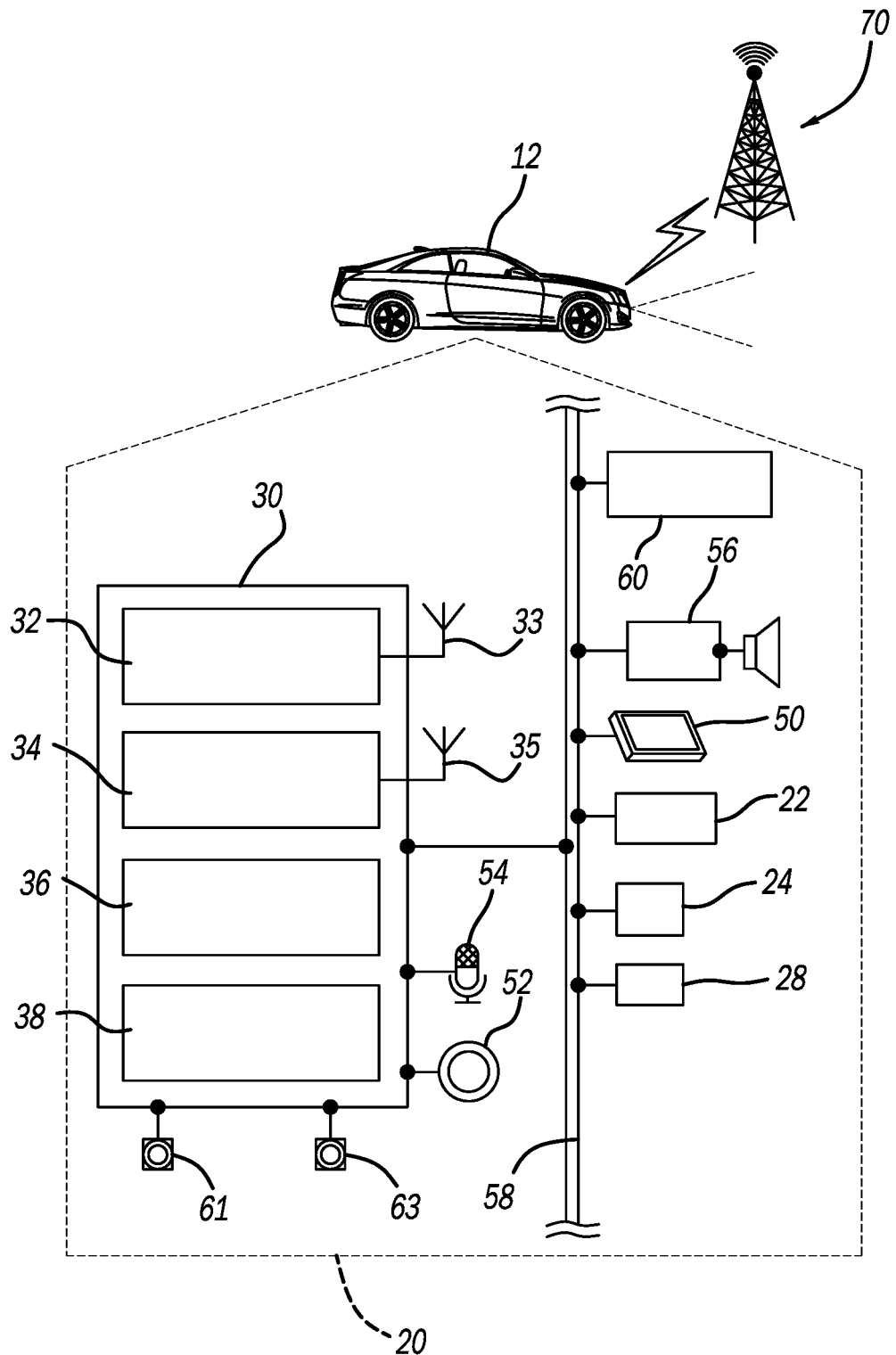
FIG. 1 is a block diagram depicting an exemplary embodiment of an electronics system capable of utilizing the system and method disclosed herein.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

With reference to FIG. 1, vehicle 12 is depicted in the illustrated embodiment as a two-door coupe, but it should be appreciated that any other vehicle including motorcycles, trucks, passenger sedan, recreational vehicles (RVs), marine vessels, aircraft including unmanned aerial vehicles (UAVs), etc., can also be used. In certain embodiments, vehicle 12 may include a propulsion system with multiple generally known torque-generating devices including, for example, an engine. The engine may be an internal combustion engine that uses one or more cylinders to combust fuel, such as gasoline, in order to propel vehicle 12. The propulsion system may alternatively include numerous electric motors or traction motors that convert electrical energy into mechanical energy for propulsion of vehicle 12. The propulsion system may also be a start-stop system that will cause the engine to automatically transition to an inactive state (from an active state) when the vehicle is stopped so as to reduce the amount of idling time and thus to reduce fuel consumption and emissions.

Some of the vehicle electronics 20 are shown generally, in FIG. 1 and includes a global navigation satellite system (GNSS) receiver 22, a body control module or unit (BCM) 24, and other vehicle system modules (VSMs) 28, a telematics unit 30, vehicle-user interfaces 50-58, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media-oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the telematics unit 30, for example.

The vehicle 12 can include numerous vehicle system modules (VSMs) as part of vehicle electronics 20, such as the GNSS receiver 22, BCM 24, telematics unit 30 (vehicle communications system), vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communications bus 58 to the other VSMs including the telematics unit 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from a remote computer or facility via a land network (not shown) and telematics unit 30. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs. Examples of known VSMs 28 are a throttle controller, brake controller, and a steering controller. As follows, the throttle controller electronically or mechanically controls the vehicle's throttle, brake controller electronically or mechanically controls the vehicle's brakes, and the steering controller electronically or mechanically controls the vehicle's steering.

Global navigation satellite system (GNSS) receiver 22 receives radio signals from a constellation of GNSS satellites (not shown). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites (not shown). And, in another example, GNSS receiver 22 can be a BDS receiver that receives a plurality of GNSS (or BDS) signals from a constellation of GNSS (or BDS) satellites. The GNSS received can determine a current vehicle location based on reception of a plurality of GNSS signals from the constellation of GNSS satellites. The vehicle location information can then be communicated to the telematics unit 30, or other VSMs, such as the onboard computer 60. In one embodiment (as shown in FIG. 1), the telematics unit 30 and/or a telematics unit can be integrated with the GNSS receiver 22 so that, for example, the GNSS receiver 22 and the telematics unit 30 (or the wireless communications device) are directly connected to one another as opposed to being connected via communications bus 58. In other embodiments, the GNSS receiver 22 is a separate, standalone module or there may be a GNSS receiver 22 integrated into the telematics unit 30 in addition to a separate, standalone GNSS receiver connected to telematics unit 30 via communications bus 58.

Body control module (BCM) 24 can be used to control various VSMs 28 of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with telematics unit 30 or the onboard computer 60. Or, the BCM may be a separate device that is connected to other VSMs via bus 58. The BCM 24 can include a processor and/or memory, which can be similar to processor 36 and memory 38 of telematics unit 30, as discussed below. The BCM 24 may communicate with telematics unit 30 and/or one or more vehicle system modules, such as an engine control module (ECM), audio system 56, or other VSMs 28; in some embodiments, the BCM 24 can communicate with these modules via the communications bus 58. Software stored in the memory and executable by the processor enables the BCM 24 to direct one or more vehicle functions or operations including, for example, controlling central locking, controlling an electronic parking brake, power sun/moon roof, the vehicle's head lamps, air conditioning operations, power mirrors, controlling the vehicle propulsion system, and/or controlling various other vehicle system modules (VSMs).

Telematics unit 30 is capable of communicating data via SRWC through use of SRWC circuit 32 and/or via cellular network communications through use of a cellular chipset 34, as FIG. 1 depicted in the illustrated embodiment. The telematics unit 30 can provide an interface between various VSMs of the vehicle 12 and one or more devices external to the vehicle 12, such as one or more networks or systems at a remote call center (e.g., ON-STAR by GM). This enables the vehicle to communicate data or information with remote systems at a remote call center (not shown).

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the telematics unit 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

Telematics unit 30 can also, for example, provide vehicle 12 with certain known advanced driver-assistance system (ADAS) features, which can provide Level Two and Level Three autonomous system functionality such that vehicle 12 can handle minor dynamic driving tasks but still require intervention from a human and may, in certain situations, require assistance from a human. Examples of known ADAS features include adaptive cruise control (e.g., Full Speed Range Adaptive Cruise Control or "FSRACC") and lane assist systems, which control certain aspects of the driving experience despite a human having their hands physically on the steering wheel. As is known, adaptive cruise control functionality is one that will endeavor to cause vehicle 12 to move at a constant rate of speed while maintaining at least a predetermined distance between the vehicle and objects in a path of the vehicle. For instance, while traveling along a path, vehicle 12 will automatically adjust its speed to maintain a safe distance from third-party vehicles (target vehicles) traveling ahead of it. Moreover, if a third-party vehicle ahead of vehicle 12 slows to a halt, then vehicle 12 will also slow to a halt and stop at a predetermined distance away from the third-party vehicle.

In the illustrated embodiment, telematics unit 30 includes, the SRWC circuit 32, the cellular chipset 34, a processor 36, memory 38, SRWC antenna 33, and antenna 35. The telematics unit 30 can be configured to communicate wirelessly according to one or more SRWC protocols such as any of the Wi-Fi™, WiMAX™ Wi-Fi™ Direct, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out vehicle-to-vehicle (V2V) communications, or vehicle-to-infrastructure (V2I) communications with infrastructure systems or devices, such as at a remote call center. And, in other embodiments, other protocols can be used for V2V or V2I communications.

The SRWC circuitry 32 enables the telematics unit 30 to transmit and receive SRWC signals, such as BLE signals. The SRWC circuit can allow the telematics unit 30 to connect to another SRWC device (e.g., a smart phone, target vehicle 99, etc.). Additionally, in some embodiments, the telematics unit 30 contains a cellular chipset 34 thereby allowing the device to communicate via one or more cellular protocols, such as those used by cellular carrier system 70, through antenna 35. In such a case, the telematics unit 30 is user equipment (UE) that can be used to in carry out cellular communications via cellular carrier system 70.

Antenna 35 is used for communications and is generally known to be located throughout vehicle 12 at one or more locations external to the telematics unit 30. Using antenna 35, telematics unit 30 may enable the vehicle 12 to be in communication with one or more local or remote networks (e.g., one or more networks at a remote call center or server) via packet-switched data communication. This packet switched data communication may be carried out through use of a non-vehicle wireless access point or cellular system that is connected to a land network via a router or modem. When used for packet-switched data communication such as TCP/IP, the communications device 30 can be configured with a static Internet Protocol (IP) address or can be set up to automatically receive an assigned IP address from another device on the network such as a router or from a network address server.

Packet-switched data communications may also be carried out via use of a cellular network that may be accessible by the telematics unit 30. Communications device 30 may, via cellular chipset 34, communicate data over wireless carrier system 70. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the telematics unit 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communications bus 58.

Vehicle electronics 20 also includes a number of vehicle-user interfaces that provide vehicle occupants with a means of providing and/or receiving information, including visual display 50, pushbutton(s) 52, microphone 54, audio system 56, one or more external cameras 61, and a lidar 63. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, and/or control input. Audio system 56 provides audio output to a vehicle occupant and can be a dedicated, stand-alone system or part of the primary vehicle audio system. According to one embodiment, audio system 56 is operatively coupled to both vehicle bus 58 and an entertainment bus (not shown) and can provide AM, FM and satellite radio, CD, DVD, and other multimedia functionality. This functionality can be provided in conjunction with or independent of an infotainment module. Microphone 54 provides audio input to the telematics unit 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display 50 is preferably a touch-screen graphics display and can be used to provide a multitude of input and output functions. Display 50 can be a touch screen on the instrument panel, a heads-up display reflected off of the windshield, a video projector that projects images onto the windshield from the vehicle cabin ceiling, or some other display. For example, display 50 can be the touch screen of the vehicle's infotainment module at the center console of the vehicle's interior. Various other vehicle-user interfaces can also be utilized, as the interfaces of FIG. 1 are only an example of one implementation. The external camera (s) 61 can be part of a forward camera module (FCM) installed on the front bumper fascia of the vehicle 12 or at the externally facing side of the vehicle's rearview mirror or one of the sideview mirrors. The external camera(s) 61 can also be positioned to view the locations out front of the vehicle 12. In addition, the one or more external cameras 61 can be operative to capture an image of a field of view (FOV) which may include static and dynamic objects proximate to the vehicle (e.g., one or more target vehicles). The lidar 63 can be installed on the front bumper fascia or roof of vehicle 12. Lidar 63 may be employed to detect objects and provide a range to and orientation of those objects using reflections from the objects providing multiple scan points that combine as a point cluster range map. For example, lidar 63 can generate a laser beam, transmit the laser beam into the FOV and capture energy reflected from a target. Lidar 63 may also employ time-of-flight to determine the distance of objects from which the pulsed laser beams are reflected.

To carry out the adaptive cruise control feature, discussed above, telematics unit 30 can use sensor and module outputs (e.g., the one or more external cameras 61, lidar 63, SRWC circuitry 32, GNSS receiver 22, etc.) capable of identifying vehicle location, locating roadway markers, proximate vehicles, and other external objects. Known sensor fusion algorithms (e.g., stored in memory 38) provides accurate tracking of external objects as well as calculation of appropriate attributes such as relative velocities, accelerations, and the like. Known image processing techniques may be used to identify, locate, and monitor objects within the field of view of the external camera(s) 61 (e.g., target vehicle 99 in FIG. 2). The identification, location, and monitoring of these objects and the surrounding environment may facilitate the creation of a three dimensional (3D) object map (which may include depth map characteristics) in order to control the vehicle in the changing environment. This object map and its various features and topographies may also at least temporarily be stored to memory 38.

When one or more of the objects within the object map is determined to be a target vehicle 99, telematics unit 30 can then be operative to receive a data from this vehicle via SRWC circuitry 32 indicative of the vehicle's location and movement characteristics (i.e., V2V data). Moreover, telematics unit 30 may generate control signals for coupling to other vehicle system modules, such as the throttle controller, brake controller and steering controller VSMs 28 in order to control certain operational aspects of the vehicle in response to the image processing techniques and/or sensor fusion algorithms and/or V2V data in response to a sensor or module output. Telematics unit 30 may be operative to adjust the speed of the vehicle by reducing or increasing the throttle via the throttle controller 28 or to apply or release the friction brakes via the brake controller 28 in response to the image processing techniques and/or sensor fusion algorithms and/or V2V data in response to a sensor or module output. Telematics unit 30 may also be operative to adjust the direction of the vehicle controlling the vehicle steering via the steering controller 28 in response to the image processing techniques and/or sensor fusion algorithms and/ or V2V data in response to a sensor or module output.

The method or parts thereof can be implemented in a computer program product (e.g., telematics unit 30, etc.) embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 2:
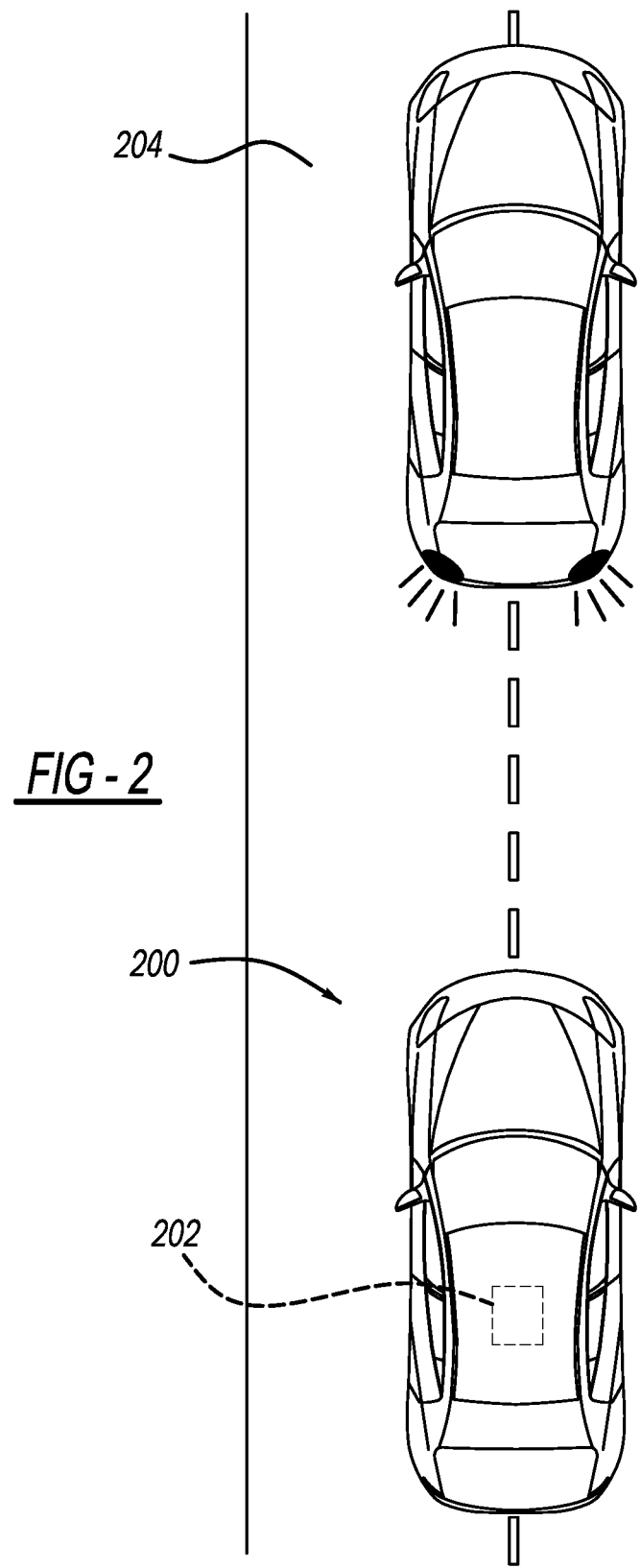
FIG. 2 is a schematic view of an exemplary vehicle following a target vehicle in accordance with the present disclosure.
Figure 3:
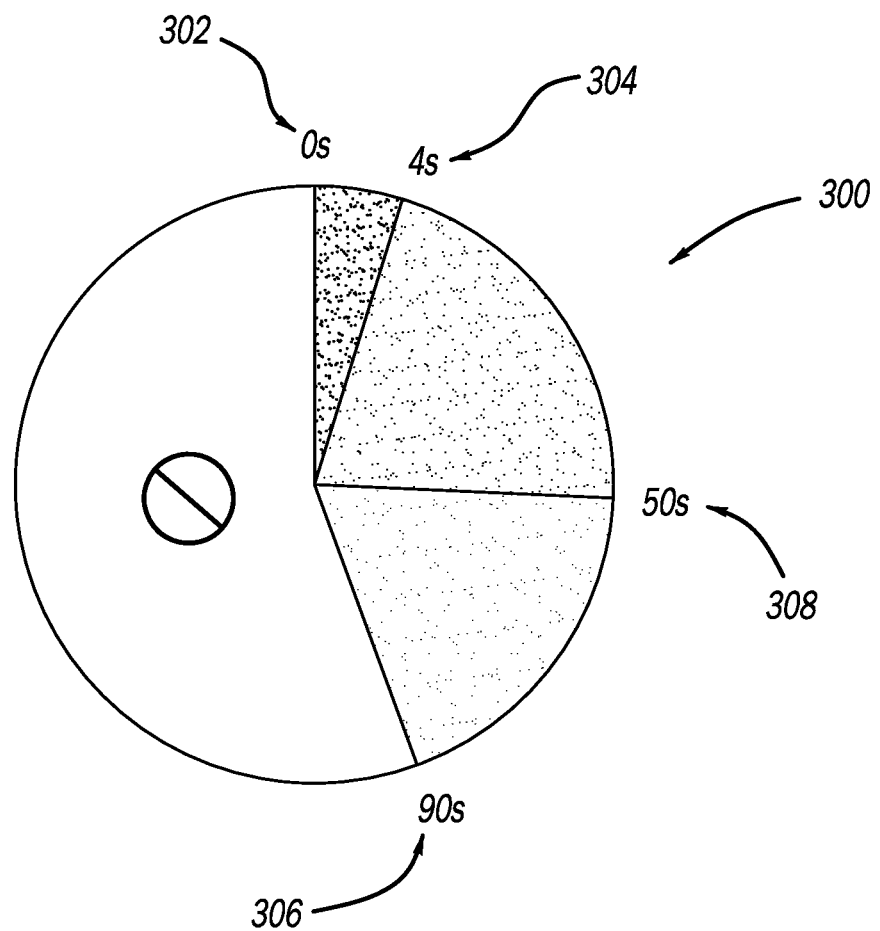
FIG. 3 is a schematic illustration of an exemplary auto resume timer in accordance with the present disclosure.
Figure 4:
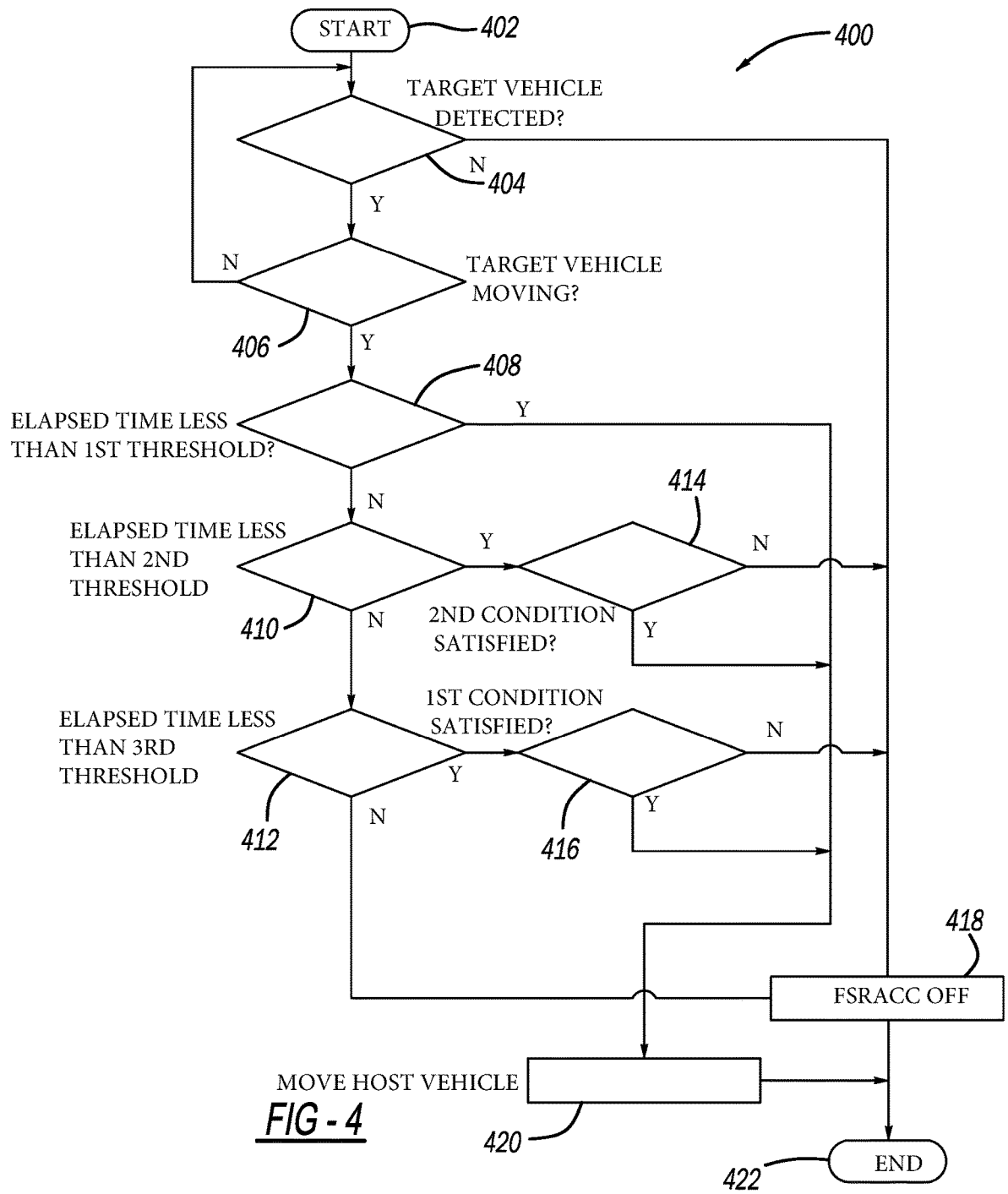
FIG. 4 is an exemplary flow chart for the utilization of exemplary system and method aspects disclosed herein.

Referring now to FIGS. 2-4 operation of an exemplary embodiment of the present disclosure will be described. Vehicle 200 incorporates a full speed range adaptive cruise control system 202 (FSRACC) in accordance with the present disclosure. The FSRACC 202 includes at least one sensor (not shown) which is configured to detect a target vehicle 204. The sensor(s) may include one or more cameras, lidar sensors, sonar sensors, and the like without limitation. The FSRACC 202 controls the vehicle to move at a driver-selected speed along a route when the FSRACC 202 is engaged and assisting in vehicle operation. The sensor(s) of the FSRACC 202 detect the target vehicle 204 and based upon the signals received from the sensor(s), the FSRACC 202 operates the brake and throttle systems of the vehicle 200 to maintain at least a predetermined minimum distance between the vehicle 200 and the target vehicle 204. If the target vehicle 204 comes to a stop, the FSRACC 202 will control the vehicle 200 to come to a stop behind the target vehicle 204. Once the FSRACC 202 controls the vehicle 200 to come to a stop, a timer 300 is initiated at 302. If the target vehicle 204 starts moving again prior to reaching a first predetermined time 304 (such as, for example, four (4) seconds illustrated in FIG. 3) the FSRACC 202 enables the vehicle 200 to move and again follow the target vehicle 204 without requiring driver input. In a conventional FSRACC system, if the timer 300 exceeds the first predetermined time 304, the FSRACC will disengage. In that instance, re-engagement of the FSRACC may require input from the driver, such as, for example, operation of the accelerator, operation of a "resume" button or the like. In contrast to these conventional FSRACC systems, the FSRACC 202 of the present disclosure may enable the vehicle 200 to initiate motion again beyond the first predetermined time 304 if the FSRACC 202 determines that one or more predetermined conditions are satisfied which will be described in detail below. In general, the predetermined conditions which will be described relate to various levels of confidence in the conditions detected by the sensors of the vehicle 200.

At a first confidence level, for example, the FSRACC 202 may determine that the number and/or different type of sensors that detect the target vehicle 204 satisfies a first predetermined condition. In this instance, if the FSRACC 202 determines that the number and/or different type of sensors which detect the target vehicle 204 satisfies the first predetermined condition, then the FSRACC 202 may enable the vehicle 200 to initiate motion again beyond the first predetermined time 304 without requiring driver input. For example, if the FSRACC 202 determines that two or more sensors and/or two or more different types of sensors detect the target vehicle 204, then the FSRACC 202 of the present disclosure may permit the vehicle 200 to initiate motion again if the target vehicle 204 starts moving again even if the amount of time which has elapsed since the timer initiation 302 exceeds the first predetermined time 304 and without requiring driver input.

In an exemplary aspect, the FSRACC 202 may prevent the vehicle 200 from again initiating motion in the absence of driver input when the timer 300 exceeds a second predetermined time 306. In the exemplary embodiment illustrated in FIG. 3, the second predetermined time 306 beyond which the FSRACC 202 will not initiate motion of the vehicle 200 without requiring driver input is ninety (90) seconds.

Optionally, the FSRACC 202 may permit the vehicle 200 to resume following the target vehicle 204 without requiring a driver input if the timer 300 does not exceed a third predetermined time 308 which is lower than the second predetermined time 306 if the FSRACC 202 determines that conditions exist corresponding to a second confidence level that may be lower than the first confidence level. If the FSRACC 202 determines that the number and/or different type of sensors which detect the target vehicle 204 satisfies a second predetermined condition that is lower than the first predetermined condition, then the FSRACC 202 may enable the vehicle 200 to initiate motion again beyond the first predetermined time 304 without requiring driver input. For example, if the FSRACC 202 determines that at least one sensor and/or type of sensor detects the target vehicle 204, then the FSRACC 202 may allow the vehicle 200 to resume following the target vehicle 204 in the absence of a driver input as long as the timer does not exceed the third predetermined time 308. Otherwise, the FSRACC 202 will only permit the vehicle 200 to resume following the target vehicle 204 if the number and/or different type of sensors which detect the target vehicle 204 satisfies the first predetermined condition that is higher than the second predetermined condition. In this manner, the FRSACC system and method of the present disclosure enables a staged approach for permitting the vehicle 200 to resume motion and follow a target vehicle 204 based upon an assessment of the confidence that the sensor(s) in the vehicle 200 reliably detects the target vehicle 204 which is contingent upon, for example, the number and/or different types of sensors in the vehicle 200 that detect the target vehicle 204.

Further, in an exemplary aspect of the present disclosure, if the sensor(s) of the vehicle 200 do not detect a target vehicle and/or the timer exceeds second predetermined time, then the FSRACC 202 does not operate the vehicle to initiate motion in the absence of a driver input commanding re-engagement of the FSRACC 202, such as, by example, an accelerator and/or resume button input being received.

An exemplary FSRACC system in accordance with the present disclosure may operate in accordance with the method 400 illustrated by the flowchart of FIG. 4 and with reference back to FIG. 3. The method 400 begins at step 402 and continues to step 404. At step 404 the system determines whether a target vehicle is detected by a sensor. If, in step 404, the system determines that no sensor detects a target vehicle, then the method continues to step 418 where the FSRACC system is dis-engaged. The method 400 then continues to step 422 where the method 400 ends.

If, however, in step 404 the system determines that a sensor detects a target vehicle, then the method 400 continues to step 406. In step 406, the system determines whether the target vehicle is moving. If, in step 406, the system determines that the target vehicle is not moving, then the method 400 returns to step 404. If, however, in step 406, the system determines that the target vehicle is moving, then the method 400 continues to step 408. In step 408, the system determines whether the time elapsed since stopping the vehicle is less than the first predetermined time 304 (such as, for example, four seconds). If, in step 408, the system determines that the time elapsed since stopping the vehicle is less than the first predetermined time 304, then the method 400 continues to step 420. In step 420, the FSRACC operates the vehicle to resume following the target vehicle and continues to step 422 where the method 400 ends. If, however, in step 408, the system determines that the time elapsed since stopping the vehicle is not less than the first predetermined time 304, then the system continues to step 410.

In step 410, the system determines whether the time elapsed since stopping the vehicle is less than the third predetermined time 308 (such as, for example, fifty seconds). If in step 410, the system determines that the time elapsed since stopping the vehicle is less than the third predetermined time 308, then the method 400 continues to step 414. In step 414 the system determines whether a second predetermined condition is satisfied. For example, the second predetermined condition may correspond to a number of sensors in the vehicle that detects the target vehicle exceeds at least one sensor and/or sensor type. If in step 414, the system determines that the second predetermined condition is satisfied, then the method 400 continues to step 420. If, however, in step 414 the system determines that the second predetermined condition is not satisfied, then the method continues to step 418.

If, however, in step 410 the system determines that the time elapsed since stopping the vehicle is not less than a third predetermined time 308, then the method 400 continues to step 412. In step 412, the system determines whether the time elapsed since stopping the vehicle is less than the second predetermined time 306 (such as, for example, ninety seconds). If, in step 412, the system determines that the time elapsed since stopping the vehicle is less than the second predetermined time 306, then the method 400 continues to step 416. In step 416, the system determines whether a first predetermined condition is satisfied. For example, the first predetermined condition may correspond to a number of sensors in the vehicle that detects the target vehicle exceeds at least two sensors and/or sensor types. If in step 416 the system determines that the first predetermined condition is satisfied, then the method 400 continues to step 420. If, however, in step 416, the system determines that the first predetermined condition is not satisfied, then the method continues to step 418. If, however, in step 412, the system determines that the time elapsed since stopping the vehicle is not less than a second predetermined time 306, then the method 400 continues to step 418.

While the method 400 of FIG. 4 includes steps 410 and 414, it is to be understood that these steps are optional. Further, it is to be understood that any number of steps 410 and 414 may be added to the method and continue to practice the present disclosure.

In an exemplary embodiment of the present disclosure, the FSRACC system may permit the vehicle 200 to resume following the target vehicle 204 only if the level of confidence indicated by the sensors of the vehicle 200 increase as the amount of time that has elapsed from the time when the vehicle 200 initially stopped increases. For example, an FSRACC system in accordance with the present disclosure may permit the vehicle 200 to resume following the target vehicle 204 if only a camera on the vehicle 200 detects the target vehicle 204 if only four seconds have elapsed since the vehicle 200 has stopped, and may permit the vehicle 200 to resume following the target vehicle if only a radar sensor on the vehicle 200 detects the target vehicle if between four and fifty seconds have elapsed, and may permit the vehicle 200 to resume following the target vehicle 204 if the target vehicle 204 is detected by both a camera sensor and a radar sensor on the vehicle if between fifty and ninety seconds have elapsed. In this manner, the confidence level with which an array of sensors on the vehicle detect a target vehicle may be relied upon to permit the vehicle to resume following the target vehicle beyond predetermined time periods since the vehicle initially stopped.

Further, in accordance with another exemplary embodiment of the present disclosure, it is to be understood that the plausibility of a sensor detecting a target vehicle may also be determined. For example, in an exemplary embodiment, the FSRACC system may optionally determine whether the amount of time that a particular sensor detects the target vehicle exceeds a predetermined time. If a sensor has not detected a target vehicle for an amount of time that exceeds the predetermined time, then the system may determine that the sensor has not detected the target vehicle with an adequate amount of plausibility and, therefore, discount and/or ignore that sensor. In this manner, an additional level of confidence may be instilled and/or provided that any one of the sensors detects a target vehicle with a desired level of plausibility before relying upon that sensor's detection of a target vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A full speed range adaptive cruise control system for a host vehicle, the system comprising:
 a plurality of sensors in the host vehicle, wherein each of the plurality of sensors generate a signal;
 a memory configured to comprise one or more executable instructions and a processor configured to execute the executable instructions, wherein the executable instructions enable the processor to:
 detect a target vehicle as being stopped along a route based upon at least one of the signals from the plurality of sensors;
 cause the host vehicle to stop at a distance from the target vehicle;
 begin a timer when the host vehicle has stopped;
 keep the host vehicle stopped and do not move the host vehicle without a driver input unless:
 if the timer is within a first predetermined time period and one of the plurality of sensors detects that the target vehicle is moving along the route then cause the host vehicle to move;
 if the timer is within a second predetermined time period and two sensors of the plurality of sensors detect that the target vehicle is moving along the route then cause the host vehicle to move; and
 if the timer is within a third predetermined time period and more than two sensors of the plurality of sensors detect that the target vehicle is moving along the route then cause the host vehicle to move.

2. The system of claim 1, wherein the first predetermined time period is less than the second predetermined time period which is less than the third predetermined time period.

3. The system of claim 1, wherein the executable instructions further enable the processor to disengage the adaptive cruise control if the timer exceeds the third predetermined time period.

4. The system of claim 1, wherein the plurality of sensors comprises at least two different types of sensor.

5. The system of claim 4, wherein if the timer is within the third predetermined time period and more than two sensors of the plurality of sensors detect that the target vehicle is moving along the route then cause the host vehicle to move if the more than two sensors comprise more than one type of sensor.

6. The system of claim 1, wherein the executable instructions further enable the processor to determine whether the amount of time which at least one of the plurality sensors has detected a target vehicle exceeds a predetermined timer count threshold.

7. The system of claim 6, wherein the executable instructions further enable the processor to determine that the at least one of the plurality of sensors has not detected a target vehicle if the predetermined timer count threshold is not exceeded.

* * * * *